United States Patent
Tulpule

[19]

[11] Patent Number: 5,911,127
[45] Date of Patent: Jun. 8, 1999

[54] PREDICTION OF CHILLER COMPRESSOR MOTOR OVERHEATING

[75] Inventor: Sharayu Tulpule, Farmington, Conn.

[73] Assignee: Carrier Corporation, Farmington, Conn.

[21] Appl. No.: 08/869,323

[22] Filed: Jun. 5, 1997

[51] Int. Cl.[6] .................................................. G05B 1/01
[52] U.S. Cl. ........................................ 702/190; 702/196
[58] Field of Search ................. 702/86, 127, 182–185, 702/188–190, 196, 197; 364/528.1, 528.11

[56] References Cited

U.S. PATENT DOCUMENTS

| | | | |
|---|---|---|---|
| 4,577,270 | 3/1986 | Sugano et al. ........................... | 364/151 |
| 5,394,322 | 2/1995 | Hansen ..................................... | 364/151 |
| 5,633,800 | 5/1997 | Bankert et al. .......................... | 702/183 |
| 5,654,907 | 8/1997 | Lange ...................................... | 702/104 |
| 5,740,033 | 4/1998 | Wassick et al. .......................... | 364/149 |

*Primary Examiner*—John Barlow
*Assistant Examiner*—Craig Steven Miller

[57] ABSTRACT

The impending overheating of the compressor motor in a chiller is predicted by comparing measured output values in the chiller with output values predicted by passing said output values and chiller input values through a Kalman filter. Variances which exceed thresholds are used to predict the overheating condition. The Kalman filter is derived from a low order state space model of the chiller, the matrix values of which are derived by linear regression from the outputs and states resulting from random signal input excitation of a high order model of the chiller in a computer.

6 Claims, 4 Drawing Sheets

PREDICTION OF CHILLER COMPRESSOR MOTOR OVERHEATING

Technical Field

This invention relates to monitoring the thermodynamic operation of a chiller system for providing early warning information about chiller abnormal operations which may be indicative of a compressor motor overheating condition.

1. Background Art

As is known, chillers provide chilled water for cooling purposes, and are expected to offer uninterrupted service in a cost-effective manner. Traditionally, chillers have had safety features to prevent operation under improper conditions, including use of controllers with built-in diagnostic capabilities. Conventionally, however, the diagnostics only detect certain chiller operational conditions that exceed normal design values, and result in shut down of the chiller and display of related alarm codes. Before an alarm occurs, there is no indication of any impending trouble in the system, so a motor starting to overheat as compressor performance starts to degrade will go unnoticed for long periods of time. By the time the alarm occurs, it is already too late since the system is shut down; additionally, the motor may be damaged significantly, requiring major repairs.

2. Disclosure of Invention

Objects of the invention include detecting chiller performance degradation which allows inference of impending failures, in order to initiate service before machine failure occurs; predicting the need for chiller service so that it can be accommodated at a convenient time rather than on an emergency basis; and providing for sustained chiller operation.

This invention is predicated in part on development of a low order, linear, state space thermodynamic model of a chiller from an accurate, thermodynamic mathematical model based on non-linear algebraic and differential equations, which accurately characterizes compressor motor overheating conditions.

The invention is also predicated on utilization of a Kalman filter based on a low order model of the thermodynamics of the chiller to provide, during online operation, representations of states and outputs of the chiller, which in turn can be utilized to detect impending compressor motor overheating.

According to the present invention, online monitoring of the chiller is achieved by monitoring input or causation parameters, and measurable output or result parameters, and passing them through a Kalman filter which is based on a reduced order state space representation or model of the thermodynamics of the chiller. According further to the invention, the reduced order model is achieved by random excitation of the inputs of the high order model in a computer, over a large number of samples, and utilizing linear regression techniques on the resulting outputs and states determined in the high dimensional model, to derive matrix coefficients for the low order state space model. The inputs may be typical inputs for an actual chiller of the type for which a health monitoring system is being developed, and the random variations may be limited, such as between 99% and 100% of those nominal, actual chiller inputs.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
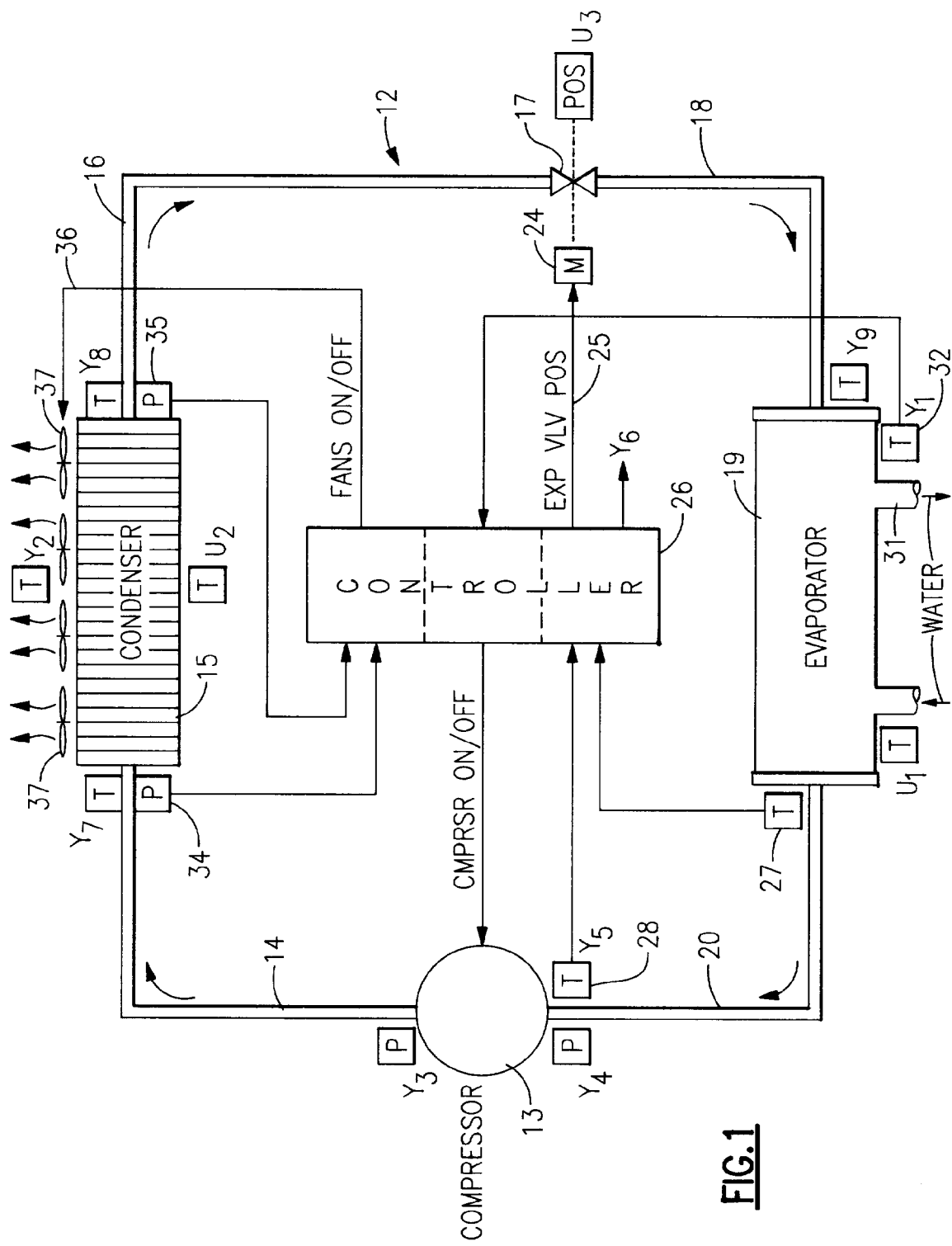
FIG. 1 is a stylized, schematic diagram of a chiller which may be monitored in accordance with the present invention.

Referring now to FIG. 1, a chiller 12, with sensors involved in the practice of the present invention, includes a compressor 13 which supplies high pressure refrigerant vapor over a fluid conduit 14 to a condenser 15. Liquid refrigerant flows from the condenser over a fluid conduit 16 to an expansion valve 17, the output of which is passed through a fluid conduit 18 to an evaporator 19, and thence the refrigerant vapor is passed through a fluid conduit 20 to the compressor 13. The valve 16 is controlled in response to a stepper motor or other valve control device 24 which in turn is controlled by a signal on a line 25 from a controller 26. The signal on the line 25 is based upon the superheat condition of the vapor in the conduit 20, which is calculated in a conventional way from the difference between the temperature at the outlet of the evaporator 19, as sensed by a temperature sensor 27, and the temperature of the refrigerant vapor at the inlet to the compressor 13, as sensed by a temperature sensor 28. The temperature of water at an outlet 31 of the evaporator 19, as sensed by a temperature sensor 32, is utilized in the controller 26 to turn the compressor on and off so as to maintain the water temperature setpoint. The pressure head across the condenser, as determined by the difference between the condenser inlet pressure, sensed by a pressure detector 34, and the condenser outlet pressure, as sensed by a pressure detector 35, is utilized by the controller to provide a signal on a line 36 to turn a bank of fans 37 on or off, as is appropriate. All of the apparatus described thus far represents a conventional chiller, and it may be implemented and controlled in a conventional fashion.

In accordance with the invention, an accurate mathematical model of the chiller based on nonlinear algebraic and differential equations which describe the flow, pressure and temperature dynamics of the chiller, developed in a conventional way, can accurately characterize the compressor motor overheating condition, which the invention seeks to predict. For a reciprocating compressor, the model may be similar to any of the following, 1) Clark, D. R. and W. B. May (1985), *HVACSIM+ Building Systems and Equipment Simulation Program—User's Manual*, U.S. Department of Commerce, National Bureau of Standards, NBSIR 85-3243.

2) Clark, D. R. (1985a), *HVACSIM+Building Systems and Equipment Simulation Program—Reference Manual*, U.S. Department of Commerce, National Bureau of Standards, NBSIR 84-2996.

3) Clark, D. R., C. Park and G. E. Kelly (1986), *HVACSIM+Building Systems and Equipment Simulation Program—Building Loads Calculation*, U.S. Department of Commerce, National Bureau of Standards, NBSIR 86-3331.

For a chiller with a centrifugal compressor, the model may be similar to those expressed in 4) Nadira, R. and I. Schick, *Modeling and Simulation of an HVAC Refrigeration System*, Simulators IV, Proceedings of the SCS Simulators Conference, Apr. 6–9, 1987, Orlando, Fla. Vol. 18, No. 4.

5) Clark, D. R. (1985b) *Centrifugal Chiller Model: Preliminary Documentation*, U.S. Department of Commerce, National Bureau of Standards, Not Released.

The model is then utilized to generate a large number of data sets by successively exciting the model (in the computer program) with variable inputs. As an example, it was determined by observing the response of an exemplary chiller system that the frequency of response of the system parameters ranged between a minimum frequency of 0.005 Hz and a maximum frequency of 0.33 Hz. A clock (sampling rate) is chosen to be the reciprocal of twice the maximum frequency, which equates to one sample every 1.52 seconds. In order to catch the slowest responses, the duration of the sampling period is chosen to be the reciprocal of the minimum frequency of response, which turns out to be 204 seconds, resulting in 134 samples. Each sample utilizes excitation of three inputs $U_1$–$U_3$, set forth in Table 1.

TABLE 1

| INPUTS | STATES | OUTPUTS |
|---|---|---|
| $U_1$ Evaporator Entering Water Temperature | $X_1$ Refrigerant Enthalpy in Condenser | $Y_1$ Evaporator Leaving Water Temperature |
| $U_2$ Condenser Entering Air Temperature | $X_2$ Refrigerant Mass in Condenser | $Y_2$ Condenser Leaving Air Temperature |
| $U_3$ Expansion Valve Position | $X_3$ Refrigerant Enthalpy in Evaporator | $Y_3$ Compressor Discharge Pressure |
| | $X_4$ Refrigerant Mass in Evaporator | $Y_4$ Compressor Suction Pressure |
| | $X_5$ Air Enthalpy in Condenser | $Y_5$ Compressor Suction Temperature |
| | $X_6$ Refrigerant Saturated Temperature in Condenser | $Y_6$ Super Heat Temperature |
| | $X_7$ Water Enthalpy in Evaporator | $Y_7$ Refrigerant Entering Temperature in Condenser |
| | $X_8$ Refrigerant Saturated Temperature in Evaporator | $Y_8$ Refrigerant Leaving Temperature in Condenser |
| | $X_9$ Compressor Efficiency | $Y_9$ Refrigerant Entering Temperature in Evaporator |

Each of the inputs comprises a signal having a value which is a nominal or typical value for the particular chiller involved, which is, however, either increased or decreased by one percent in each sampling period. The increase or decrease for each signal in turn is in response to a pseudorandom number sequence, such that each input varies in a substantially random fashion with respect to itself, and the combination of inputs also varies in a substantially random fashion. In each sampling time, the inputs, U, the states, X, and the outputs, Y, all shown in Table 1, are all recorded. That is, for each sampling, there are 21 items of data recorded. These are stored for use as is about to be described. At the same time, or later, from the stored data in the same or another computer, the standard deviation of each of the values of X and Y is computed, for use in determining error thresholds that are significant in identifying predicted motor overheating, all as is described hereinafter.

The development of the Kalman filter is summarized in the following steps:

1. Create a computer model that describes chiller thermodynamic processes as a set of nonlinear algebraic differential equations.

2. Select input, state, and output parameters that are affected by a motor overheating condition.

Figure 2:
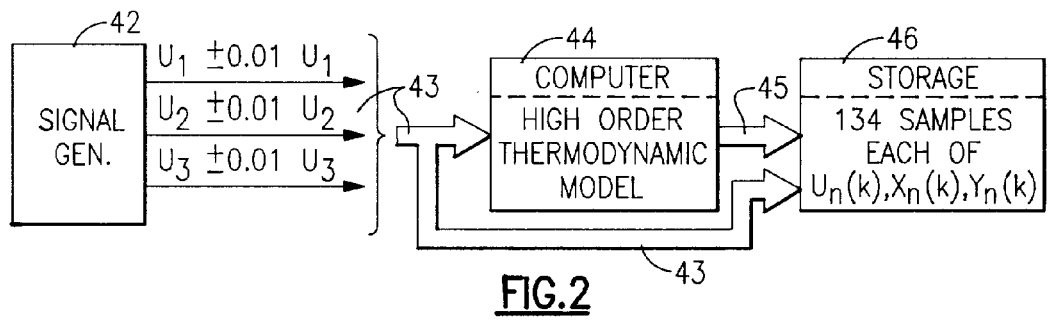
FIG. 2 is a schematic illustration of the apparatus utilized in a data acquisition portion of the development of an embodiment of the present invention for a particular chiller type.

3. Excite the chiller model with random signals at each of the selected inputs; store resulting selected state and output parameter data. FIG. 2

Figure 3:
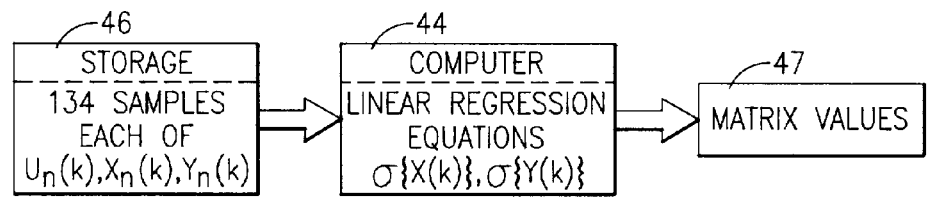
FIG. 3 is a simplified schematic illustration of the apparatus utilized during a linear regression portion of the development.

4. Use linear regression equations on the stored data to fit the chiller state derivatives and chiller outputs to determine model matrix values; use stored data to define error thresholds as ± three standard deviations. FIG. 3

5. Create a model comprising a ninth order set of linear equations using the matrix values found in Step 4

6. Develop a Kalman filter based on the state space model.

Referring now to FIG. 2, the setup for obtaining the large number of samples uses a signal generator 42 which includes the pseudorandom binary sequence generators and drivers to produce $U_1$–$U_3$ plus or minus one percent thereof, in response to the pseudorandom binary sequences. These are applied over signal lines 43 to a computer 44 having the high order thermodynamic model contained therein. The model, being excited by the inputs on the lines 43, produces values of X and Y (Table 1) for each successive input, which are provided over a suitable bus 45 to storage 46, along with the corresponding inputs, U.

The 134 samples of all of the values of U, X and Y, totaling 2,814 data items, are then applied, as shown in FIG. 3, from the storage 46 to the computer 44 where the mean values are removed from the data and then recursive, least-squares estimate linear regression is utilized to fit the data to derive matrix coefficient values for a ninth order state space model. The matrix values revealed in a display 47 are then used to create a linear, ninth order chiller model which is represented as $$X(k+1)=AX(k)+BU(k)+W(k);\qquad\text{(EQN. 1)}$$

$$Y(k)=CX(k)+DU(k)+V(k),\qquad\text{(EQN. 2)}$$

where A, B, C, and D are the transition matrices, and $W(k)$ and $V(k)$ are zero mean, white gaussian sequences of covariances $Q_k$ and $R_k$ respectively. The recursive, least-squares estimation routine can be found in 6) Soderstrom, T., and P. Stoica, *System Identification*, Prentice Hall Inc., New York, N.Y., 1989, Chapter 9, pp. 324, 349–350.

7) Dexter, A. L., et al, *Self-tuning Control Algorithm for Single-chip Microcomputer Implementation*, IEE Proceedings, Vol. 130, No. 5, September 1983, pp. 255–260.

8) Franklin, G. F., and D. Powell, *Digital Control of Dynamic Systems*, Addison Wesley, Reading, Mass., 1980, pp. 210–215.

Once a reduced order, linear, state space model is derived from the data produced by the high order chiller thermodynamic model (FIGS. 2, 3), the Kalman filter is then developed based on this reduced order state space representation, in a conventional fashion, as expressed in 9) Gelb, A., Editor, *Applied Optimal Estimation*, M.I.T. Press, 1980, Chapters 3 and 4.

Figure 4:
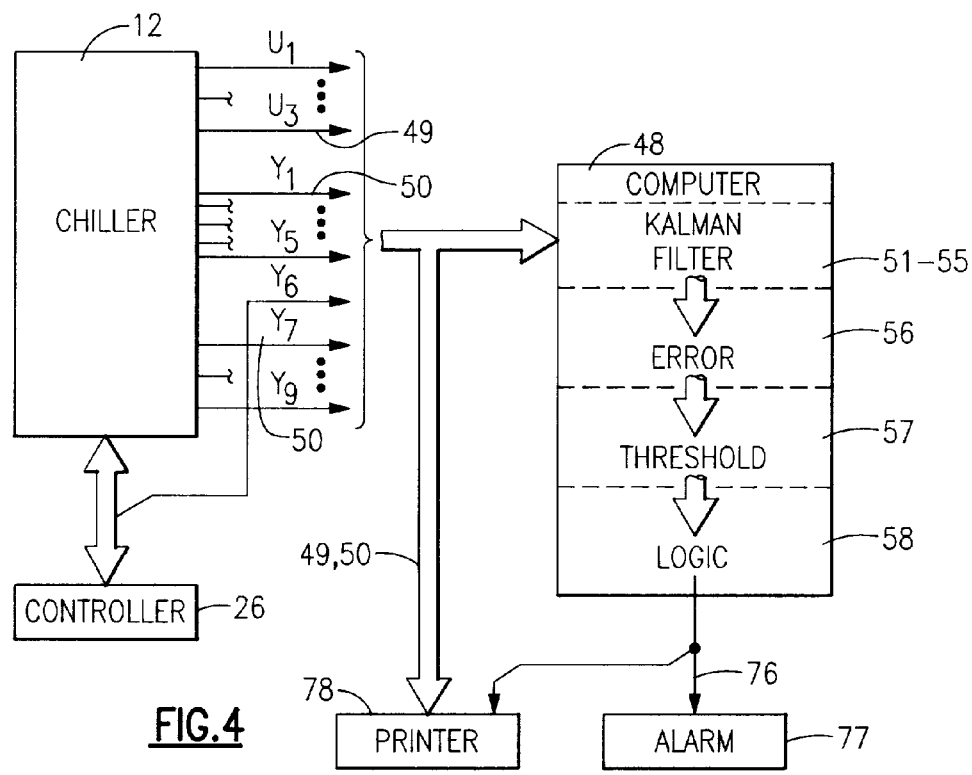
FIG. 4 is a simplified schematic illustration of the apparatus utilized during online monitoring of a chiller in accordance with the present invention.

Referring to FIG. 4, in operation, the chiller of FIG. 1 is operated while an on-site, on-line computer 48 (generally not the computer of FIGS. 2 and 3) monitors the inputs $U_1$–$U_3$ and the outputs, $Y_1$–$Y_9$, on lines 49 and utilizes the Kalman filter technique to predict, for the sensed actual values of U and Y at a particular time of sampling, k, what the values of the outputs and the states should be at the next time of sampling, k+1.

In the following, it should be understood that, as is known, at each sample time, the Kalman filter is itself updated prior to its use in filtering the chiller outputs so as to predict states and outputs. The sensed outputs are first used to update the Kalman filter equations and then the inputs and outputs are passed through the updated Kalman filter equations to compute predicted states (X) and outputs (Y).

The initial state estimates are X(0)=0; and the initial state estimate error covariance matrix is P(0)=0; these are established during initialization, on start up. In the filter, at each sampling time step k, the state estimate is updated using:

$$\hat{X}(k|k)=\hat{X}(k|k-1)+K(k)\{y(k)-C\hat{X}(k|k-1)\}, \quad \text{(EQN. 3)}$$

where $\hat{\ }(k|k-1)$ is the filter state estimate at time k based on the measurements up to time k-1. The sampling, k, may be separated by about three minutes. The updated Kalman gain matrix K is computed as:

$$K(k)=P(k|k-1)C^T[CP(k|k-1)C^T+R_k]^{-1} \quad \text{(EQN. 4)}$$

where P(.|.) is the state estimate error covariance matrix which satisfies the following relations:

$$P(k|k-1)=A\ P(k-1|k-1)A^T+Q_{k-1}, \quad \text{(EQN. 5)}$$

$$P(k|k)=[I-CK(k)]P(k|k-1). \quad \text{(EQN. 6)}$$

where T means transposed.

Prior to taking the next measurement at k+1, the state estimate is propagated ahead in time one step using the state dynamics $$\hat{X}(k+1|k)=A\hat{X}(k|k)+BU(k); \quad \text{(EQN. 7)}$$

this is then used as $\hat{X}(k|k-1)$ in EQN. (1) of the next sampling.

At each sampling time, after the Kalman filter is updated, the known inputs, U, and measured sensor signals, Y, from the chiller are processed by the Kalman filter to generate optimal estimates of the chiller states, $\hat{X}$, and predictions of the sensor measurements, $\hat{Y}$. Subtracting $\hat{Y}$ from the actual measurements, Y, forms the error signal vector, e, which is used to formulate a failure decision. For a Kalman filter, $e(k)=Y(k)-C\hat{X}(k|k-1)$; therefore, the error signal e(k) will be zero-mean, white, with covariance matrix.

Figure 5:
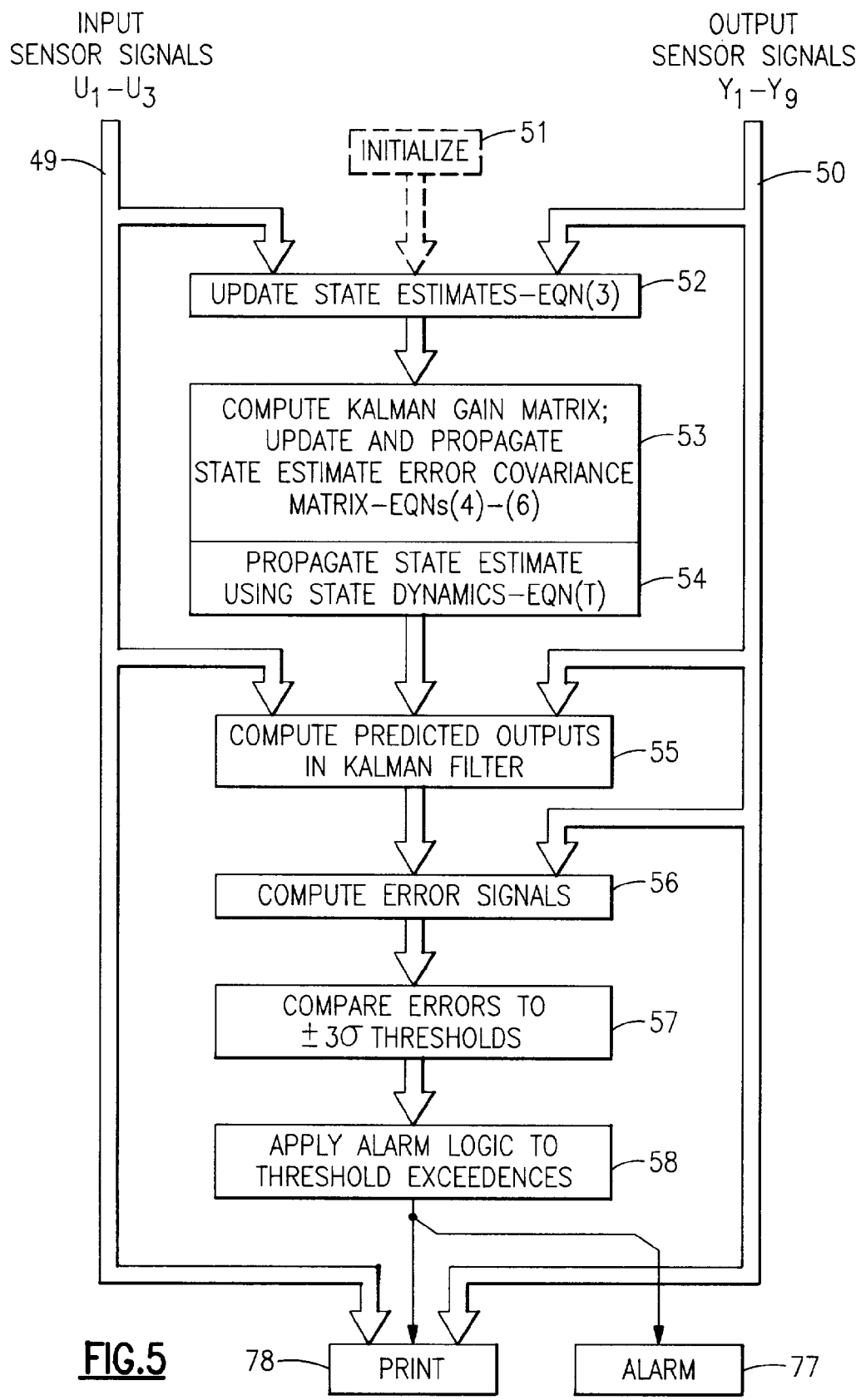
FIG. 5 is a stylized chart illustrating the processes being carried out during online monitoring of the invention as in FIG. 4.

The process carried out for each sampling period within the computer 48 during online monitoring is illustrated in FIG. 5. When the monitoring system is first put online, it will be initialized (block 51), including the initial state estimates and initial state estimate error covariance matrix as described hereinbefore. At each sampling time, which may be on the order of once every three minutes, the state estimates are updated (block 52) as in Equation (3). Next, the Kalman gain matrix is computed (block 53) and the state estimate error covariance matrix is updated and propagated to the next sampling time, as in Equations (4)–(6). The state estimate is propagated (block 54) to the next sampling time using state dynamics, as in Equation (7). With the Kalman filter updated, the input sensor signals U1–U3 on lines 49 and the output sensor signals Y1–Y9 on lines 50 are applied to the Kalman filter (block 55). The Kalman filter generates optimal estimates of the chiller states, $\hat{X}$, and predictions of the sensor measurements, $\hat{Y}$. The prediction of the sensor measurements, $\hat{Y}$, is compared against the actual current sensor measurement of Y, and the estimates of the chiller states, $\hat{X}$, is compared with the previous propagated estimates of the chiller states (block 56), to produce error signals. The error signals are compared with corresponding thresholds (block 57), which in this embodiment are taken to be ± three standard deviations, and the exceedances are examined in an alarm logic routine (block 58) to determine if such exceedances are indicative of an impending compressor motor overtemperature condition, as set forth in FIG. 6.

Figure 6:
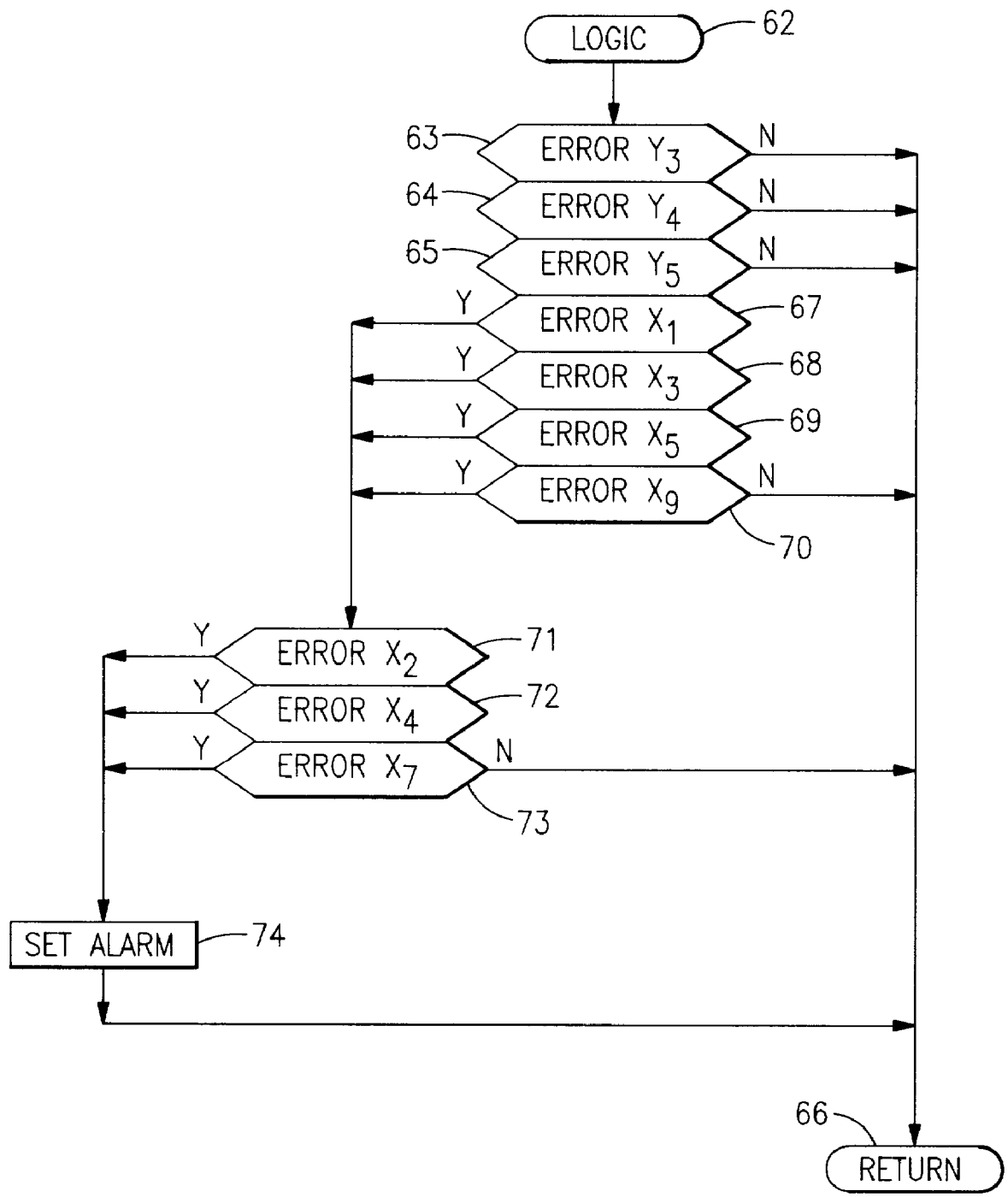
FIG. 6 is a logic flow diagram of an alarm logic routine.

The logic routine of FIG. 6 is reached through an entry point 62 and tests 63–65 require that for an alarm condition to be recognized, there must be errors in the values of Y3, Y4 and Y5. If not, other programming is reached through a return point 66 without setting an alarm condition. If all three errors are present (Y3, Y4 and Y5), then a series of tests 67–70 determine if any one of X1, X3, X5 or X9 has an error. If so, an alarm condition may occur; but if none of these are in error, then the return point 66 is reached without setting an alarm condition. If any one of X1, X3, X5 and X9 are in error, then a series of tests 71–73 determine whether any one of X2, X4 or X7 is in error. If not, the return point is reached without setting an alarm condition. But, if all of Y3, Y4, Y5 are in error, any one of X1, X3, X5, or X9 is in error, and any one of X2, X4 and X7 is in error, then a step 74 sets the alarm condition.

In FIG. 5, the alarm condition will cause a signal on a line 76 to actually activate an alarm 77 of any suitable sort and to cause a printer 78 to print out all the current input and output parameters on the lines 49 and 50 thereby to provide an indication of the nature of the impaired operation.

The controller 26 and the parameters utilized to control the chiller 12 as expressed hereinbefore are exemplary merely; the chiller may be controlled in any desired way and the invention may be practiced simply by ensuring that the effect of the controller on the chiller is accurately reflected in the original, high order model. Similarly, the invention may be practiced in chillers having wide variety of variations with respect to the embodiment disclosed for exemplary purposes herein.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of predicting chiller compressor motor overheating, comprising:

once for each chiller type preparing, in a computer, a high order mathematical model of the chiller based on nonlinear algebraic and differential equations which describe the flow, pressure and temperature dynamics of the chiller;

exciting the chiller model with random values of selected input signals at each of a plurality of inputs, the variations of which will provide variations in values of measurable output parameters and values of unmeasurable, computable chiller states affected by motor overheating;

for each variation in said excitation input signals, recording one set of values including each of said input values, each of said output values and each of said computable chiller states;

using linear regression equations on the stored data, fitting said recorded chiller state values and output values to determine matrix values for a low order linear state space model of the chiller;

creating a low order state space model comprising a set of linear equations using the matrix values determined in the step preceding this step;

developing a Kalman filter based on said low order linear state space model created in the step preceding this step; and in normal operation of each chiller operating said chiller by providing input signals thereto including said selected inputs while measuring the values of said selected inputs and said measurable output parameters;

providing said measured input values and output values to a computer employing said Kalman filter to determine predicted output values;

comparing said predicted output values with said measured output values; and indicating an alarm whenever the variance between the computed output values and the measured output values are indicative of a motor overheating condition.

2. A method according to claim 1 wherein said low order state space model is a ninth order model.

3. A method according to claim 1 wherein:

said inputs are temperature of the water entering the evaporator, temperature of the air entering the condenser, and position of the expansion valve;

said outputs are temperature of the water leaving the evaporator, temperature of the air leaving the condenser, pressure of the compressor discharge, pressure of the compressor inlet, temperature of the compressor inlet, super heat temperature, temperature of refrigerant entering the condenser, temperature of the refrigerant leaving the condenser, and temperature of the refrigerant entering the compressor; and said states are enthalpy of the refrigerant in the condenser, mass of the refrigerant in the condenser, enthalpy of the refrigerant in the evaporator, mass of the refrigerant in the evaporator, enthalpy of the air in the condenser, refrigerant saturated temperature in the condenser, enthalpy of the water in the evaporator, refrigerant saturated temperature in the evaporator, and compressor efficiency.

4. A method according to claim 1 further comprising:

establishing threshold values for deviations between estimated output values and measured output values; and said indicating step comprises indicating an alarm only in response to variance between said estimated output signals and said measured output signals which exceed said thresholds.

5. A method according to claim 1 further comprising:

determining the standard deviation for each of said output values and each of said computable chiller states indicated by said recorded sets of values; and wherein:

said indicating step comprises indicating an alarm whenever the variance between the computed output values and the measured output values and between the calculated chiller states previously calculated propagated chiller states which exceed three standard deviations of the corresponding value are indicative of a motor overheating condition.

6. A method according to claim 1 wherein said indicating step comprises indicating said alarm only in response to said variances exceeding thresholds (1) for each of compressor discharge pressure, and compressor suction pressure, and compression suction temperature, together with variances exceeding thresholds (2) for any one of refrigerant enthalpy in the condenser, refrigerant enthalpy in the evaporator, air enthalpy in the condenser, or compressor efficiency, together with variances exceeding thresholds (3) for any one of refrigerant mass in the condenser, refrigerant mass in the evaporator, and water enthalpy in the evaporator.

* * * * *